(No Model.)
S. C. BOWER.
FENCE.
No. 530,504.  Patented Dec. 11, 1894.
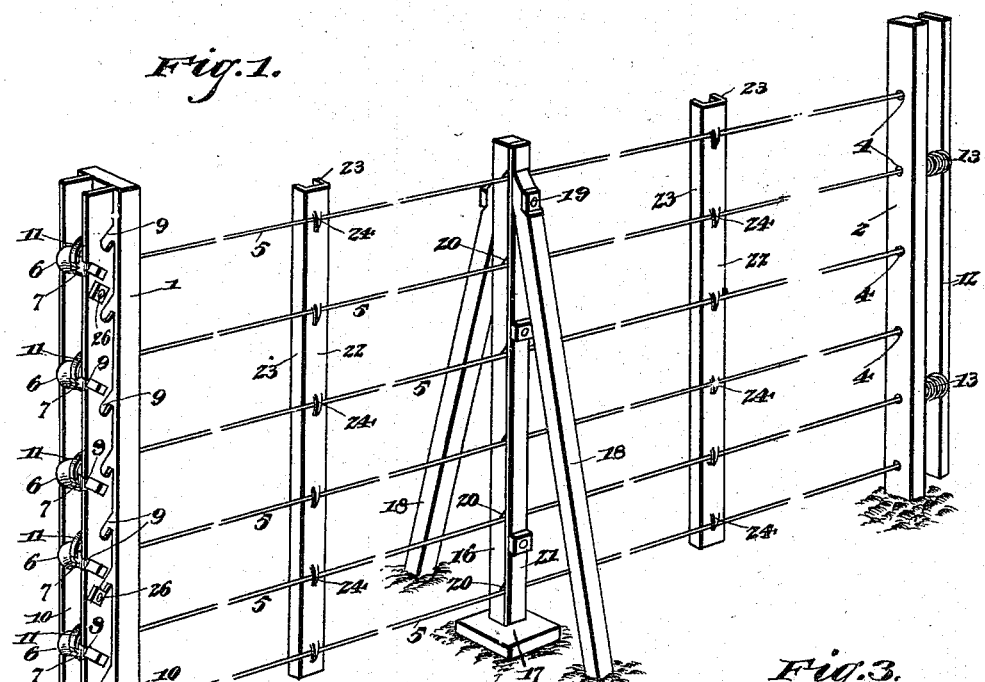
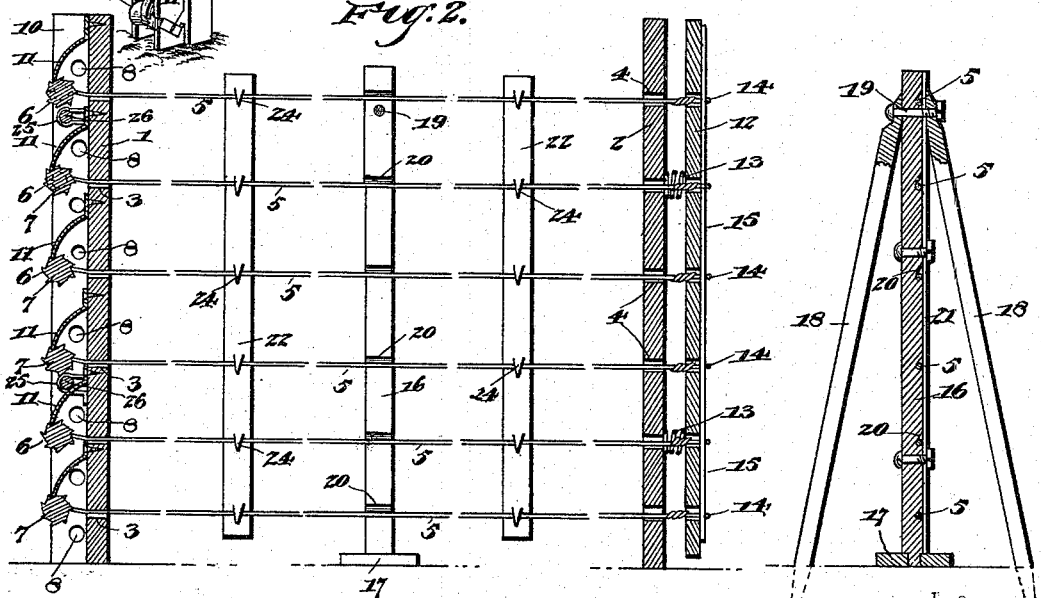
Witnesses
B. S. Ober
J. F. Riley
Inventor
Samuel C. Bower,
By his Attorneys.
C. A. Snow & Co.

UNITED STATES PATENT OFFICE.

SAMUEL C. BOWER, OF MOUNTAIN EAGLE, PENNSYLVANIA.

FENCE.

SPECIFICATION forming part of Letters Patent No. 530,504, dated December 11, 1894.

Application filed July 14, 1894. Serial No. 517,583. (No model.)

*To all whom it may concern:*

Be it known that I, SAMUEL C. BOWER, a citizen of the United States, residing at Mountain Eagle, in the county of Centre and State of Pennsylvania, have invented a new and useful Fence, of which the following is a specification.

This invention relates to improvements in fences.

The object of the present invention is to improve the construction of wire fences, to increase their durability, and to enable the fence wires to be maintained at the desired tension, and to permit them to yield to avoid breaking.

The invention consists in the construction and novel combination and arrangement of parts hereinafter fully described, illustrated in the accompanying drawings, and pointed out in the claim hereto appended.

In the drawings—Figure 1 is a perspective view of a fence constructed in accordance with this invention. Fig. 2 is a vertical longitudinal sectional view of the same. Fig. 3 is a transverse sectional view.

Like numerals of reference indicate corresponding parts in all the figures of the drawings.

1 and 2 designate end posts provided with perforations 3 and 4, for the passage of horizontal fence wires 5, which are maintained at the desired tension by a vertical series of wire stretchers 6. The wire stretchers each consist of a spool or shaft provided with journals and having a ratchet 7. The journals are arranged in bearing openings 8 and 9 of vertical bearing bars 10, and one end of the spool or shaft is squared to be engaged by a wrench or similar tool for rotating the spool or shaft to tighten the fence wire. The ratchet 7 is engaged by a depending curved spring 11, to prevent retrograde rotation; and the upper ends of the depending outwardly curved springs are secured to the adjacent face of the post 1.

The bearing bars are provided with series of bearing openings, arranged at different intervals in order that various numbers of wire stretchers may be employed to accommodate fences having different numbers of fence wires, and to enable the wire stretchers to be applied to fences having six, eight, or more fence wires; and it will be readily understood that any number of bearing openings may be employed for this purpose. These bearing openings are arranged adjacent to the edges of the bars and the openings 9 consist of slots or recesses to enable the spools or shafts to be readily removed when desired.

In order to prevent any liability of the fence wires breaking from contraction by cold or other causes, a compensator is arranged on the end post 2, and consists of a vertical bar 12 and springs 13 interposed between the bar and the fence post. The compensator bar 12 is provided with perforations through which pass the fence wires which terminate in eyes 14 receiving a locking rod 15.

The fence is supported at intervals between the end posts by intermediate posts 16, each of which is provided with a foot piece 17 to rest upon the ground and is supported by oppositely-inclined transversely-disposed braces 18, having their upper ends beveled and secured to the side faces of the posts 16 by a horizontal bolt 19. The supplemental post is provided at one side with notches 20 to receive the fence wires, which are retained in the notches by a metal plate 21, secured to the face of the post by bolts or other suitable fastening devices. The ends of the inclined transverse braces 18 are inserted in the ground; and this construction enables the invention to withstand lateral strain.

At intervals between the intermediate posts, steel pickets 22 are employed and are provided at their vertical edges with flanges 23 to stiffen them. The fence wires are secured to the steel pickets by tongues 24, struck up from the pickets and bent around the fence wires and securely fastening the pickets to them. The post is provided with loops 25 through which pass bolts 26 for securing the bars 10 to the post.

It will be seen that the fence is simple and comparatively inexpensive in construction, that it possesses great strength and durability, that the fence wires may be maintained at the desired tension, and that the compensator prevents any liability of the fence wires to break accidentally when subject to a heavy strain.

Changes in the form, proportion, and the minor details of construction may be resorted to without departing from the spirit or sacrificing any of the advantages of this invention.

Having described my invention, what I claim is—

The combination with a fence, of a compensator arranged at one end thereof and connected with the wires, the vertical bearing bars located at the other end of the fence and provided with series of bearing openings located at different intervals, the adjustable and detachable spools or shafts journaled in the bearing openings of the bearing bars and provided with ratchets, and the depending outwardly bent springs secured at their upper ends to the adjacent post and having their lower ends engaging the ratchets, substantially as described.

In testimony that I claim the foregoing as my own I have hereto affixed my signature in the presence of two witnesses.

SAMUEL C. BOWER.

Witnesses:
H. WILBUR BICKLE,
D. W. WOODRING.